350-169
CROSS REFERENCE SEARCH ROOM
May 14, 1968 D. H. PRITCHARD 3,383,460
LIGHT BEAM MODULATION AND COMBINATION APPARATUS
Filed Aug. 25, 1965
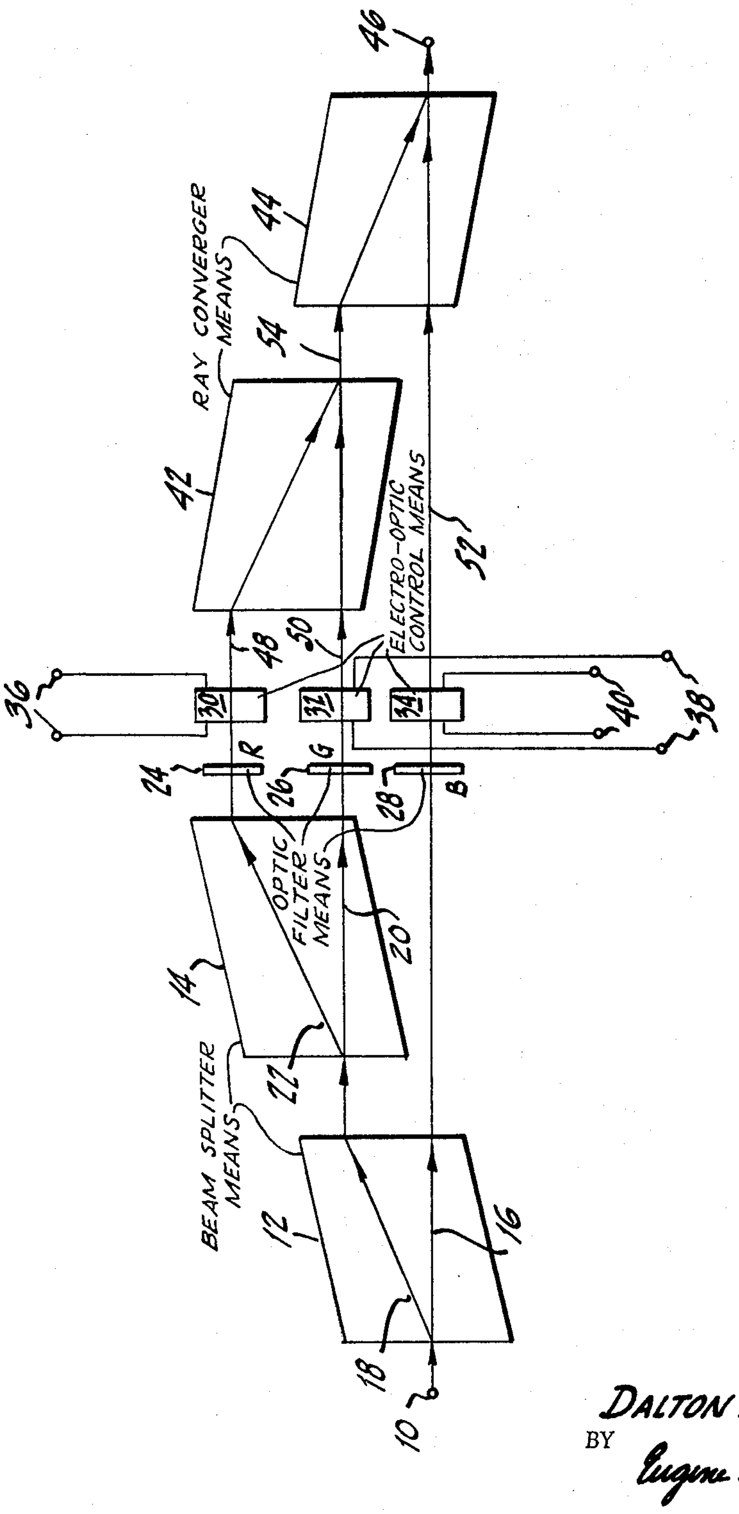
INVENTOR.
DALTON H. PRITCHARD
BY Eugene M. Whitacre
Attorney United States Patent Office 3,383,460
Patented May 14, 1968

3,383,460
LIGHT BEAM MODULATION AND COMBINATION APPARATUS

Dalton H. Pritchard, Princeton, N.J., assignor to Radio Corporation of America, a corporation of Delaware Filed Aug. 25, 1965, Ser. No. 482,355
10 Claims. (Cl. 178—5.4)

ABSTRACT OF THE DISCLOSURE

Apparatus for modulating individual components of a collimated beam of light and for combining the modulated components with perfect registry through the use of bi-refringent crystals and electro-optic controls.

This invention relates to light beam modulation and combination apparatus and, more particularly, to such apparatus for use in color television display systems.

Perhaps the thing that has generated the most interest in the scientific world in recent years has been the laser. What with its special characteristics of monochromaticity, spatial coherence, and high power density, many different uses have been envisioned for it by engineers and scientists alike. Among other uses, lasers have been proposed for communications systems—in space, on earth, and undersea—for military surveillance and weapons systems, for medical and computer technology, and for spectroscopic research.

Laser techniques have also been proposed for direct view optical display systems. Such techniques, it has been suggested, can be used to provide a large screen, high brighteness display of television information, for example, and of color television information in particular. One of the first requirements for a display system of this latter type is to have some arrangement for modulating the laser beam with the appropriate color television signal information. A number of arrangements for doing just this have been proposed in the past. Each, by and large, operated to separate a laser beam having monochromatic sources in proper portions of the frequency spectrum into red, green, and blue primary color components, to then modulate these components in the proper proportion according to supplied color signal information, and to then re-assemble the individual components into a common beam suitable for feeding into a single light beam deflection system. The manner in which most of those arrangements have re-assembled the various modulated primary color components, however, have militated against any widespread acceptance of the particular scheme put forth. This resulted from the fact that the complex, mechanically aligned lens and dichroic mirror configurations commonly employed for the reassembling often caused mis-registry of the re-combined laser beam. Such arrangements require, as a result, some sort of dynamically operative control to counter-balance the causes of this mis-registry, and at an expense it would be desirable to eliminate.

It is an object of the present invention, therefore, to provide light beam modulation and combination apparatus which avoids the above-mentioned limitations and disadvantages of prior such apparatus.

While the present invention will hereinafter be described as it would be used in a laser beam color television display system, it will be obvious to those skilled in the art that its teachings are equally applicable with any collimated light beam having the characteristics set forth below and not necessarily only with a laser beam. It will also become obvious that the principles set forth are not limited to color television display systems but apply equally as well to any type system wherein individual components of a beam of light are to be operated upon by a modulating signal and then combined before distribution throughout the remainder of the system.

Thus, light beam modulation and combination apparatus constructed in accordance with the invention includes first input means for supplying a collimated beam of light. The apparatus additionally includes bi-refringent crystal beam splitter means for separating the light beam into ordinary and extra-ordinary rays and, also, optic filter means for passing ordinary and extra-ordinary rays having predetermined light characteristics. The apparatus further includes electro-optic control means for modulating, in accordance with supplied electrical signals, the ordinary and extra-ordinary rays so passed, in addition to second input means for supplying those signals. The light beam modulation and combination apparatus finally includes bi-refringent crystal ray converger means for combining the modulated rays into a single registered beam of modulated light.

For a better understanding of the present invention, together with further objects thereof, reference is had to the following description, taken in connection with the accompanying drawing, and its scope will be pointed out in the appended claims.

In the drawing, there is shown one form of light beam modulation and combination apparatus according to the principles of the present invention, and particularly one which is useful in color television display systems utilizing three primary color components. Such apparatus includes, first of all, means for supplying a collimated beam of light. This means, represented in the drawing by the input terminal 10, may comprise any source of collimated light which supplies a beam containing energy in the red, green, and blue portions of the visible spectrum. For example, a krypton-ion laser having strong and simultaneously oscillating lines at 6,471 A. (red), 5,208 A. (green), and 4,762 A. (blue) may be used as the light source. In this embodiment, it is assumed that the beam of light is initially unmodulated.

The light beam modulation and combination apparatus also includes bi-refringent crystal beam splitter means for separating the light beam from input terminal 10 into ordinary and extra-ordinary rays. This means comprises a pair of uniaxial crystals 12 and 14 of calcite or sodium nitrate material, for example.

The collimated beam from input terminal 10, upon entering the crystal 12, is divided into two equal components. One component essentially vibrates parallel to the principal section of the crystal 12 and is denoted as the ordinary ray 16. At normal incidence, as is the case assumed in the drawing, this ray proceeds directly through the crystal without bending. The second component of the divided light beam essentially vibrates perpendicular to the principal section of the crystal 12 and is denoted as the extra-ordinary ray 18. This ray, however, is refracted in the plane of the principal section by an angle $\theta$, given by the expression tan $$\phi=\frac{n_o^2-n_e^2}{n_o^2+n_e^2}$$

where $n_o$ and $n_e$ are the ordinary and extra-ordinary indices of the crystal 12. For calcite crystals, $n_o=1.658$, $n_e=1.486$, and $\theta=6°12'$ while for sodium nitrate crystals, $n_o=1.587$, $n_e=1.336$, and $\theta=9°40'$. Upon emerging from the crystal 12, the extra-ordinary ray 18 is refracted back to its original direction, parallel to the ordinary ray 16. The two output rays are thus travelling side by side, but are orthoganally polarized with respect to one another, the ordinary ray 16 being polarized normal to the plane of the drawing and the extra-ordinary ray 18 being polarized parallel to the plane of the drawing. The actual distance between the two output rays depends upon the physical thickness of the crystal 12.

The extra-ordinary ray 18 emerging from the crystal 12 is itself divided into ordinary and extra-ordinary ray components 20 and 22 when supplied to the crystal 14. Assuming ray 18 to be supplied at normal incidence, the ordinary ray 20 proceeds through the crystal 14 without bending. The extra-ordinary ray 22 on the other hand, is refracted through an angle determined by the ordinary and exrta-ordinary indices of the crystal 14. This angle of refraction may be the same as that in the crystal 12 (similar materials used for both crystals); or may be different from that angle (dissimilar materials used). Also, the thickness of the crystals 12 and 14 may be made equal or different, whichever is desired. Upon emerging from the crystal 14, the extra-ordinary ray 22 is once again refracted back to its initial direction, parallel to the ordinary ray 20.

It will be readily apparent that the collimated light beam from input terminal 10 has thus been separated into three ordinary and extra-ordinary ray components. It will be obvious that the beam can be broken up into many components through the use of additional uniaxial crystals. Such additional crystals might very well be used in a random access memory arrangement (to be described below) but are not needed in the three primary color component television environment herein considered. It will also be obvious that by using only one crystal, the supplied beam can be broken up simply into two components. This would be the case were the present invention to be used in a two primary color component television display system environment, such as one which uses orange and cyan as the primary colors. As will become clear, hereinafter, the teachings of the television are applicable to any of these arrangements.

Referring once again to the three primary color component television environment, however, the light beam modulation and combination apparatus of the drawing also includes optic filter means for passing ordinary and extra-ordinary rays having predetermined light characteristics. This means comprises a red color filter 24 placed in the path of the emerging extra-ordinary ray 22 from the crystal 14 for passing the "red" energy of that light ray. It also comprises a green color filter 26 placed in the path of the emerging ordinary ray 20 from the crystal 14 for passing the "green" energy of that light ray. It additionally comprises a blue color filter 28 placed in the path of the emerging ordinary ray 16 from the crystal 12 for passing its "blue" energy. The absorption characteristics of these three glters—or of an orange and cyan filter in a two primary color component television environment for that matter—are so chosen that, either by themselves or in conjunction with various neutral density filters, a proper white light mix is obtained after the respective light energies are recombined.

The light beam modulation and combination apparatus further includes electro-optic control means for mulating, in accordance with supplied electrical signals, the ordinary and extra-ordinary rays passed by the filter means and, also, means for supplying those signals. The control means comprises a trio of electro-optic cells 30, 32, and 34 coupled, as shown, to the input terminals 36—36, 38—38, and 40—40 respectively. Each of these cells 30, 32, and 34 is composed of typical electro-optic cell material—potassium dihydrogen phosphate (KDP), ammonium dihydrogen phosphate (ADP), or potassium titanium niobate (KTN), for example—and is effective to rotate the plane of polarization presented to an incoming light ray in response to changes in an electric field applied to it so as to vary the amount of light energy passed by each cell. Input terminals 36—36, 38—38, and 40—40 together comprises the signal supply means which cause these electric field changes to occur, and may consecutively represent red, green, and blue electric signal output terminals of a color television receiver. These terminals may alternatively represent respective red, green and blue output terminals of a color television camera or other appropriate pickup device.

Depending upon the amplitude of the color signal supplied to each of the input terminals 36—36, 38—38, or 40—40, three possibilities present themselves: (1) either all the light energy directed toward the correspondingly associated electro-optic cell will be passed; or (2) all of the light energy will be rejected; or (3) some portion of the light energy will be passed while some of it will be rejected. The difference between the amount of light enenrgy passed by each cell with a signal supplied to its respective input terminal with respect to the amount of light energy passed in the absence of a supplied signal is thus an indication of the percentage of that energy present in the color signal transmitted by the color camera and associated equipment. The "red" energy ray passing filter 24, the "green" energy ray passing filter 26, and the "blue" energy ray passing filter 28 are each, therefore, intensity modulated by this color control signal—electro-optic cell arrangement.

The light beam modulation and combination apparatus of the present invention finally includes bi-refringent crystal ray converger means for combining the intensity modulated "red," "green," and "blue" energy rays into a single registered beam of modulated light. This means specifically includes a second pair of uniaxial crystals 42 and 44 but, in general, would include the same number of crystals as are used in the bi-refringent crystal beam splitter means. Crystals 42 and 44 may also be of calcite or sodium nitrate material and have their entering faces oriented relative to their respective optical axes in a manner to join incident light ray components into a single beam component containing the same information content as the incident rays contained individually. This beam convergence action is to be contrasted with the beam splitting action provided by the first pair of uniaxial crystals 12 and 14, whose entering faces were oriented relative to their respective optical axes in a manner to separate an incident beam of light into individual ray components. As will now be made clear, the convergence action is performed with perfect color registry so that the combined red-geen-blue intensity modulated rays emerge from the crystals 42 and 44 as a single beam of light modulated in accordance with televised color information.

As shown in the drawing, this convergence action is essentially a two step process. First, crystal 42 operates to combine the intensity modulated "red" energy ray 48 with the intensity modulated "green" energy ray 50. Second, crystal 44 operates to combine the intensity modulated "blue" energy ray 52 with the combined "red" and "green" intensity modulated ray 54 emerging from the crystal 42. Considering first the operation of the crystal 42, the "green" intensity modulated ray 50 is assumed to be normally incident to the entering face of the crystal 42 and therefore passes through it without bending. The "red" intensity modulated ray 48, on the other hand, is bent towards the "green" intensity modulated ray 50 in accordance with the angle of refraction of the crystal 42. By selecting uniaxial crystal 42 to be of the same bi-refringent material as crystal 14 and, also, of equal thickness, the two rays 48 and 50 will automatically come together and be joined at the point of emergence from the crystal 42. Different bi-refringent material can also be used for the two crystals, in which case the crystal having the smaller bi-refringence would have to be somewhat thicker in order for the rays 48 and 50 to combine at the emerging face of the crystal. The relationship between the thickness of the two crystals would obviously then depend upon the angles of refraction of the respective crystals. More particularly, the ratio of the two thicknesses would then equal the inverse of the ratio of the tangents of their respective angles of refraction $$\left(\frac{t_1}{t_2}=\frac{\tan \theta_2}{\tan \theta_1}\right)$$

Considering next the operation of the crystal 44, it will be readily apparent that it is analagous to the operation of the crystal 42. Thus, the combined "red" and "green" intensity modulated ray 54 emerging from the crystal 42 is bent towards the "blue" intensity modulated ray 52, assumed to be normally incident to the entering face of the crystal 44, according to the angle of refraction of the crystal 44. By selecting uniaxial crystal 44 to have the same bi-refringence and thickness as crystal 12, or, alternatively, to have different bi-refringence and, therefore, different but calculable thickness, the two rays 52 and 54 will also automatically converge at the point of emergence from the crystal 44. The beam emerging from the crystal 44 is, therefore, a single registered beam of light modulated in accordance with televised color information and suitable for presentation to any appropriate light beam deflection system or optical recording system. Such systems are represented in the drawing by the output terminal 46.

The operation of the light beam modulation and combination apparatus just described can be classified as "simultaneous" in the sense that the red, green, and blue color signals are each supplied simultaneously to intensity modulate the respective energy contents of the supplied collimated beam of light. The apparatus of the present invention operates equally as well, moreover, in a "sequential" sense wherein the supplied collimated light beam is already modulated with composite color signal information and the red, green, and blue energy paths to the converging crystals 42 and 44 are switched "ON" in sequence. In a dot-sequential system environment, for example, each of the three electro-optic cells 30, 32, and 34 is supplied with the appropriate phase of a continuous amplitude 3.58 mc. sine wave switching signal. This switching signal is supplied to the individual cells via the input terminals 36—36, 38—38, and 40—40, respectively and turns "ON" the individual color energy paths at the appropriate times corresponding to the proper color component in the composite signal. In a field-sequential system environment, on the other hand, a matrixing arrangement can be used to supply 20 cycle switching pulses of 1/60 second duration at the terminals 36—36, 38—38, and 40—40 to switch "ON" in sequence the electro-optic cells 30, 32, 34 and, hence, the red, green, and blue energy paths. For a line-sequential system environment, 5,250 cycle pulses of 1/15,750 second duration can be supplied at these same terminals to also provide this switching of energy paths. But, regardless of whether the "simultaneous" type of system environment is used with the light beam modulation and combination apparatus or whether the "sequential" type of system environment is used, the basic operative steps of the invention of separating the supplied light beam into the three primary color components (or into the two primary color components in a two color television system), modulating these components in the proper proportion in accordance with the color signal information, and combining the light components with perfect registry into one common beam are present in each case. The only essential difference between the two types of arrangements is that in the former, an intensity type modulation is employed to provide the color information while in the latter, a pulse type modulation is employed.

As was previously mentioned, light beam modulation and combination apparatus constructed in accordance with the invention can also be used in a random access memory arrangement and, particularly, in a photo-cell memory array. Variable density light filters would there be used instead of the color filters used in the color television display system arrangement just described. By switching "ON" one or more electro-optic cells in response to supplied computer control information, any number of different light rays of predetermined intensity can be coupled through to the bi-refringent crystal convergence means to be combined therein. The resulting output beam of light can then be deflected to interrogate a designated photo-cell of a memory array to read out the elecrical signal information stored therein. It will be noted that present here, too, are the operative steps of separating the collimated beam into component parts, modulating component parts according to supplied electrical signal information, and re-assembling those parts with perfect registry into a single modulated beam.

What is claimed is:

1. Light beam modulation and combination apparatus comprising:
 - first input means for supplying a collimated beam of light;
 - bi-refringent crystal beam splitter means for separating said beam into ordinary and extra-ordinary rays;
 - optic filter means for passing ordinary and extra-ordinary rays having predetermined light characteristics;
 - electro-optic control means for modulating, in accordance with supplied electrical signals, the ordinary and extra-ordinary rays so passed;
 - second input means coupled to said control means for suppling said signals;
 - and bi-refringent crystal ray converger means for combining said modulated rays into a single registered beam of modulated light.

2. Light beam modulation and combination apparatus according to claim 1 in which said beam splitter means and said ray converger means include a like number of bi-refringent crystals and wherein corresponding ones of said beam splitter and ray converger crystals are composed of the same bi-refringent material and are of equal thickness.

3. Light beam modulation and combination apparatus according to claim 1 in which said beam splitter means and said ray converger means include a like number of bi-refringent crystals and wherein corresponding ones of said beam splitter and ray converger crystals are composed of different bi-refringent material and are related to one another in thickness by the inverse of the ratio of the tangents of their respective angles of refraction.

4. Light beam modulation and combination apparatus according to claim 1 in which said first input means includes a laser.

5. Light beam modulation and combination apparatus according to claim 1 in which said first input means supplies a collimated beam of light containing energy in the portions of the visible spectrum corresponding to the primary color components of a color television display system and in which said optic filter means includes like color filters for respectively passing those color energies present in the supplied collimated beam.

6. Light beam modulation and combiation apparatus according to claim 5 in which said first input means supplies a collimated beam of light containing energy in the orange and cyan portions of the visible spectrum corresponding to the primary color components of a two primary color component television display system and in which said optic filter means includes orange and cyan filters for respectively passing those color energies present in the supplied collimated beam.

7. Light beam modulation and combination apparatus according to claim 5 in which said first input means supplies a collimated beam of light containing energy in the red, green, and blue portions of the visible spectrum corresponding to the primary color components of a three primary color component television display system and in which said optic filter means includes red, green, and blue color filters for respectively passing those color energies present in the supplied collimated beam.

8. Light beam modulation and combination apparatus according to claim 7 in which the supplied collimated beam is initially unmodulated and in which said second input means simultaneously supplies red, green, and blue color signal information representative of a televised scene to respective ones of a trio of electro-optic cells included in said electro-optic control means for intensity modulating, according to said information, each of the red, green, and blue color energies passed by said color filters.

9. Light beam modulation and combination apparatus according to claim 7 in which the supplied collimated beam is initially modulated by a composite color signal representative of a televised scene and in which said second input means sequentially supplies switching signals to respective ones of a trio of electro-optic cells included in said electro-optic control means for gating through to said bi-refringent crystal ray converger means, according to said switching signals, each of the red, green, and blue color energies passed by said color filters.

10. Light beam modulation and combination apparatus according to claim 1 in which said optic filter means includes a plurality of variable density light filters and in which said second input means supplies computer controlled switching information to particular ones of a plurality of electro-optic cells included in said electro-optic control means and associated with invidiual variable density filters for gating through to said bi-refringent crystal ray converger means, selected rays of light of predetermined intensity.

References Cited

UNITED STATES PATENTS

| | | | |
|---|---|---|---|
| Re. 26,170 | 3/1967 | Harris | 346—107 |
| 2,262,524 | 11/1941 | Ball | 88—1 |
| 2,724,737 | 11/1955 | Hogan | 178—5.4 |
| 3,272,988 | 9/1966 | Bloom et al. | 250—199 |
| 3,303,276 | 2/1967 | Haeff | 178—5.4 |

ROBERT L. GRIFFIN, *Primary Examiner.*

JOHN W. CALDWELL, *Examiner.*

J. A. O'BRIEN, R. MURRAY, *Assistant Examiners.*

UNITED STATES PATENT OFFICE

CERTIFICATE OF CORRECTION

Patent No. 3,383,460 May 14, 1968

Dalton H. Pritchard

It is certified that error appears in the above identified patent and that said Letters Patent are hereby corrected as shown below:

Column 3, line 24, after "many" insert -- more --; line 36, "television" should read -- invention --; line 52, "glters" should read -- filters --.

Signed and sealed this 25th day of November 1969.

(SEAL)
Attest:

Edward M. Fletcher, Jr.
Attesting Officer

WILLIAM E. SCHUYLER, JR.
Commissioner of Patents